April 15, 1941.                G. B. POLLOCK                2,238,371
                                LENS MOUNTING
                             Filed June 26, 1939
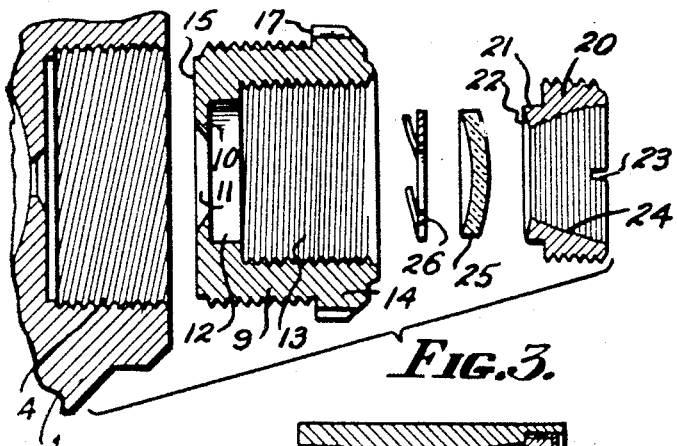
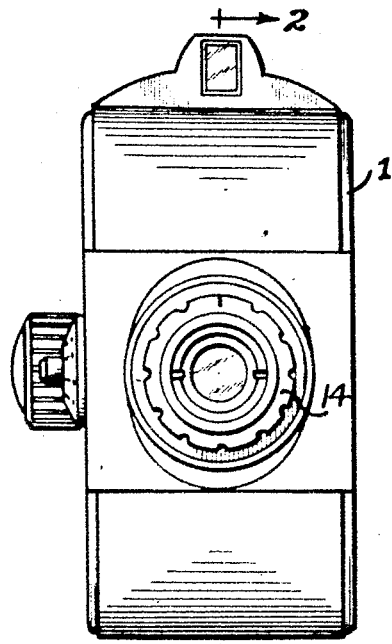
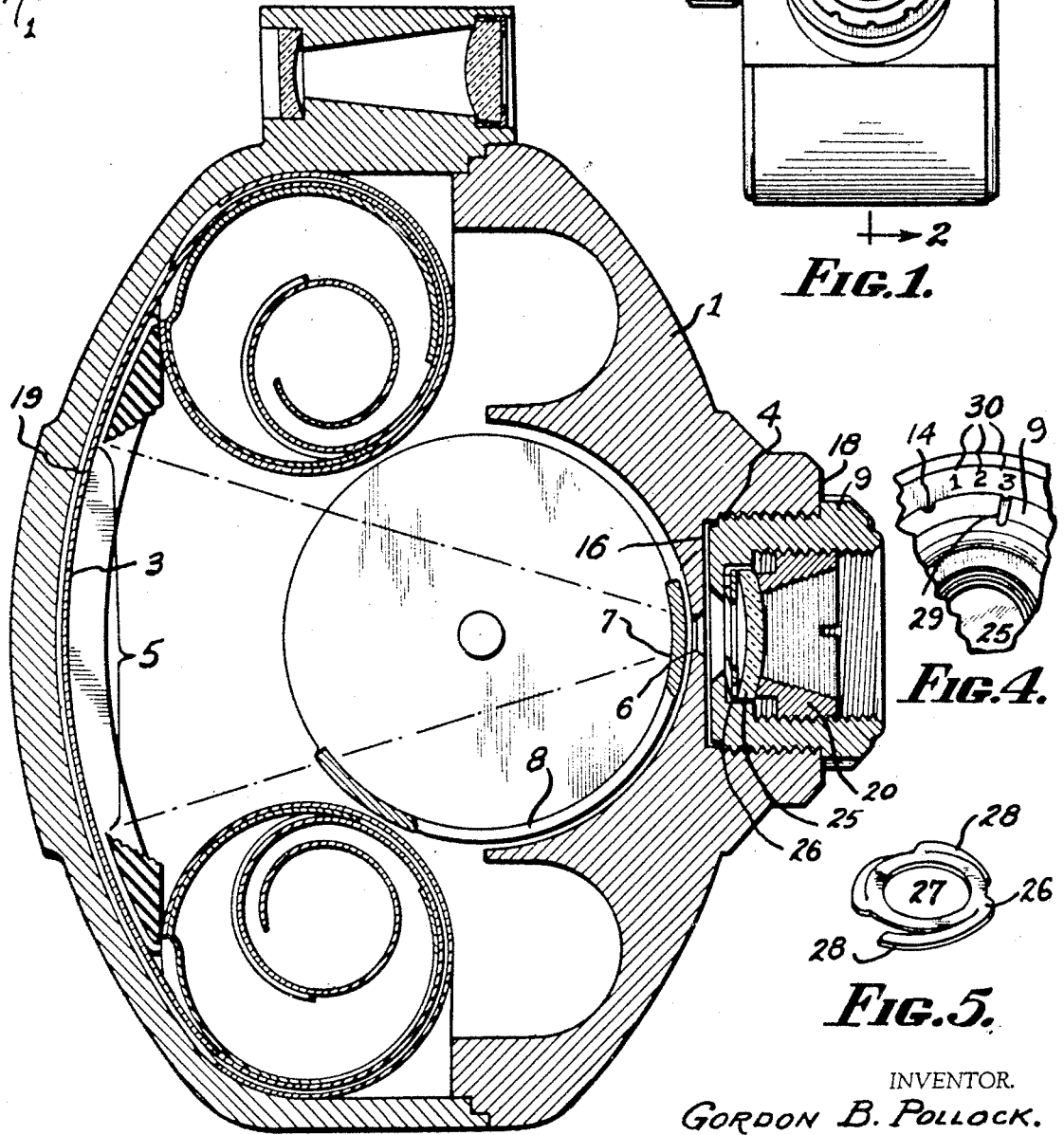
INVENTOR.
GORDON B. POLLOCK.
BY Allen & Allen
ATTORNEYS.

UNITED STATES PATENT OFFICE 2,238,371

LENS MOUNTING

Gordon B. Pollock, Los Angeles, Calif.

Application June 26, 1939, Serial No. 281,063

14 Claims. (Cl. 95—44)

My invention relates to the problem of mounting lenses in camera bodies, and in particular to the problem of the mounting of simple types of lenses in camera bodies which, in themselves, do not embody focusing means.

Hitherto, by way of example, in mounting meniscus type lenses in box cameras or other fixed focus types of camera, a fixed socket or place for the lens has been provided in the camera. Because it is not possible within commercial limits to grind large numbers of meniscus lenses to exactly the same focal length, it has been the practice for the manufacturer to place the finished lenses in an optical device individually, and classify them into a number of different groups according to their actual focal lengths. When the lenses were thus classified into groups, a special shim or number of shims was allotted to each group. In assembling the camera, a lens was chosen and the shim or shims appropriate to the classification of that lens was placed in the lens receiving socket, the lens was placed on them and the lens fastening means was put in position. This was a cumbersome, inconvenient and expensive procedure, which slowed up production schedules and offered substantial opportunity for error and inaccuracy. Moreover, the focusing of the lenses was not exact, but approximate.

The object of my invention is the provision of a less expensive procedure for the purpose. Another object of the invention is the provision of an improved lens mounting, which when the lens has been placed therein, requires no classification, can be used on any camera body of a class, or interchangeably on different cameras and is simple and inexpensive both to construct and to handle in a manufacturing schedule.

Again, it is an object of my invention to provide a lens mounting which gives a focusing feature to the camera without extra cost.

These and other objects of my invention which will be set forth hereinafter, or will be apparent to one skilled in the art upon reading these specifications, I accomplish by that certain construction and arrangements of parts, of which I shall now describe a preferred embodiment. Reference is made to the drawing, wherein:

Figure 1 is a front elevational view of a camera embodying my invention.

Figure 2 is a vertical section therethrough along the line 2—2 of Figure 1.

Figure 3 is an exploded sectional view of the lens mounting parts.

Figure 4 is a fragmentary elevational view showing focusing indicia.

Figure 5 is a perspective view of a spring washer.

The lens mounting of this invention was primarily designed for use with the camera of my copending applications and the exemplary embodiment in connection with which I shall describe my invention, pertains to the said camera. It will be understood that the utility of my invention is by no means confined thereto.

In the practice of my invention, a camera body 1, having a fixed film track 3, is provided at its front with a relatively large diameter, threaded recess 4, to receive the lens mounting. The camera body, including this threaded recess, is accurately made so that not only is the recess axially in alignment with the center of the image frame 5, but so that the bottom of the recess 4, or its top portion, or both, bear accurately a relationship to the plane of the sensitized material which is invariable for all cameras of the type being manufactured. In the camera of my specific embodiment, the main portions of the camera body are accurate die castings. Equal accuracy however, can readily be obtained in other types of construction, e. g., by accurate moulding, if the camera body is made of synthetic resin or the like, or accurate cutting or machining of the parts if made of other substances. This accuracy is not a special requirement of my invention alone, since it is both common and necessary in the manufacture of all cameras. In the particular camera illustrated, the bottom of the recess 4 is perforated as at 6, which perforation coacts with a rotative barrel shutter 7, slotted at 8, and which perforation may, if desired, constitute the diaphragm opening for the lens.

To fit in the recess, I provide a lens mounting member comprising an internally and externally threaded collar 9. The external threads match the thread of the lens mounting opening 4. The inner end of the threaded collar is provided with a shoulder 10. The shouldered portion may itself constitute a diaphragm opening 11, if a diaphragm is not otherwise provided. In any event, the end portion of the collar will be apertured for the passage of light. The aperture in the shouldered portion will be less in diameter than the outside diameter of the lens which is to be employed.

In the collar 9 and above the shoulder 10, I prefer to provide a smooth-walled barrel portion 12 to accept the lens, which barrel portion is of smaller diameter than the diameter of the internally threaded portion 13. At the end of the collar portion 9 opposite the shoulder 10 I provide an annular enlargement 14, which may be knurled or otherwise configured to facilitate turning either by hand or by a tool. The construction is such that when the collar is threaded into the opening 4 in the camera, until either the rear face 15 of the shouldered portion 10 of the collar 9 seats against the bottom 16 of the recess 4, or until the rear face 17 of the knurled ring 14 on the collar seats against the front face 18 of the camera, or both, choice of such constructions being optional, the collar 9 will be brought to a fixed and predetermined position at a distance from the plane of the sensitized material 19 which is the same for all cameras of the class and size.

I also provide a second collar or externally threaded sleeve, which is indicated at 20. This sleeve is perforated from end to end for the passage of light. Its smallest internal diameter is likewise less than the extreme diameter of the lens. It may be provided with a barrel portion 21 to enter the barrel portion 10 of the collar 9, and an abutment shoulder 22 to contact the face of the lens. The sleeve, in use, will be threaded into the collar; and to facilitate this it may be provided with cuts 23 for engagement by a tool. The sleeve is substantially shorter than the collar so that it will be wholly contained therein in use, and will not be liable to displacement. The inner bore of the sleeve may be tapered as shown at 24 substantially in accordance with the angle of view of the lens, and may be roughened or provided with ridges to minimize reflections, and also colored black, so that the sleeve acts in part as the hood for the lens. A lens is shown at 25, and a spring washer at 26. This washer comprises a body, perforated as at 27, and having external spring fingers 28.

I have indicated above that the opening 6 in the camera or the opening 11 in the collar may be so shaped and proportioned as to serve as a diaphragm. Similarly, the opening 27 may be employed for this purpose in place of any other diaphragm if properly proportioned, or a separate diaphragm disc may be used, all within the scope of my invention.

In use, the collar 9 is taken, and the spring washer 26 is placed in the barrel portion 10 thereof. The lens 25, with or without a separate diaphragm member is placed on the spring washer, and the sleeve 20 is screwed into the collar. Next the collar is screwed into an optical jig having a light source and a target and having an abutment to fix the position of the collar. The sleeve 20 is then turned back and forth until the proper image is obtained, the lens following the sleeve due to the action of the spring washer. The result of this operation is the prefocusing of the lens in the collar 9. The focusing, if accurately done, is exact and not approximate. The operation of focusing is not more difficult than the hitherto usual operation of classifying the lenses into groups and allocating shims to them. But the result of the operation is the provision of a standard fitting which may be used without change on any camera of the class and size, and when turned home in the threaded recess will result in accurate positioning of the lens with respect to the image plane.

The provision of this standard fitting which is threaded into the camera body and turned down against a seat, affords opportunity for the provision of a focusing arrangement in cameras in which such provision would normally exceed the cost limitations. When the collar 9 is threaded into the opening 4 and turned down tight, as has already been explained, the lens is accurately in the position for focusing at distances from infinity to as close to the camera as the depth of focus of the lens at the opening employed will permit. But the lens may readily be focused for closer distances by slightly unscrewing the collar 9, and this may be done without in any way disturbing the preset condition of the lens. Where the focal length of the lens is relatively long as compared with the pitch of the threads in the threaded recess 4, focusing may be accomplished with sufficient accuracy by simply turning out the collar 9 a given number of turns for a given approximate distance. I prefer, however, to give the pitch of the threads in the threaded recess 4 an exaggerated slope, as for example by employing a plurality of parallel helical threads as clearly illustrated in Figure 3. Under these circumstances, focusing can usually be accomplished for all practical distances within the compass of one turn of the collar 9. When this arrangement is adopted, I prefer to provide a suitable mark 29 on the knurled portion 14 of the collar and to provide upon the face 18 of the camera body series of indicia 30 indicative of various distances.

Modifications may be made in my invention without departing from the spirit of it. Having thus described my invention, what I claim as new and desire to secure by Letters Patent is:

1. In a camera having a focal plane, an opening in the body thereof having an abutment at fixed distance from said focal plane, and a lens mounting comprising a collar adapted to be secured in said opening, having abutment means coacting with said first mentioned abutment means, and having an integral internal shoulder, a sleeve movable in said collar, a resilient retaining means having a bearing against the interior shoulder of said collar, and a lens surmounting said resilient means and held by said sleeve, whereby said lens may be prefocused in said collar, and whereby securing said collar in said camera results in a positioning of said lens at a desired and predetermined distance from said focal plane.

2. Apparatus as claimed in claim 1 in which said sleeve is threaded in said collar.

3. In a camera having a focal plane, an opening in the body thereof having an abutment at fixed distance from said focal plane, and a lens mounting comprising a collar adapted to be threaded into said opening, having abutment means coacting with said first mentioned abutment means, and having an integral internal shoulder, a sleeve movable in said collar, a resilient retaining means having a bearing against the interior shoulder of said collar, and a lens surmounting said resilient means and held by said sleeve, whereby said lens may be prefocused in said collar, and whereby threading said collar into said camera results in a positioning of said lens at a desired and predetermined distance from said focal plane.

4. Apparatus as claimed in claim 1, in which said collar is threaded into said opening, and said sleeve is threaded into said collar.

5. Apparatus as claimed in claim 1, in which said collar is provided with an enlarged annular gripping portion extending beyond said camera body.

6. Apparatus as claimed in claim 1, in which said collar is provided with an enlarged annular gripping portion extending beyond said camera body, and in which a face of said camera body constitutes one of said abutment means and the rear face of said enlarged portion on said collar constitutes the other of said abutment means.

7. Apparatus as claimed in claim 3, in which said collar is provided with an enlarged annular gripping portion extending beyond said camera body, and in which a face of said camera body constitutes one of said abutment means and the rear face of said extending portion on said collar constitutes the other of said abutment means, and in which said threaded opening in said camera body is threaded with a steep pitch and said camera body and said gripping portion of said collar are provided with cooperating indicia for focusing during use of said camera.

8. Apparatus as claimed in claim 1 in which said sleeve constitutes a lens shade for said lens.

9. In a camera, a body having an opening therein constituting a diaphragm for a lens, a focal plane, a shutter within said camera and movable with respect to said opening, and an enlarged threaded opening communicating with said first mentioned opening, said threaded opening adapted to receive a lens mounting comprising a collar to be threaded therein, a lens resiliently mounted in said collar, and means in said collar for adjusting the position of said lens with respect thereto.

10. A process of manufacturing cameras, which comprises the steps of providing camera bodies having film tracks and threaded openings disposed opposite said film tracks, providing collars threadable into said openings and having abutment means coacting with abutment means on said cameras, resiliently mounting lenses in said collars, threading said collars into an optical jig, and adjusting the position of said lenses in said collars, whereby after adjustment, said collars may be threaded into any of said cameras, and upon interengagement of said abutments, will result in establishing the position of said lenses at respective distances from said film track appropriate to the specific focal lengths of said lenses individually.

11. In a camera, a body having a film track and an oppositely disposed threaded aperture, a collar externally threaded to enter said aperture, cooperating abutment means on said camera and on said collar for fixing the position of said collar with respect to said camera, said collar having an opening at one end of a given size, communicating with a larger barrel shaped portion, and a still larger internally threaded portion, a spring washer in said barrel shaped portion, a lens also in said barrel shaped portion, and a hollow threaded sleeve in the interior of said collar, bearing against said lens and determining the position of said lens with respect to the abutment means on said collar, the said spring washer permitting preadjustment of said lens with respect to said collar in conformation with the specific focal length of said lens.

12. In a camera, a body having a film track and an oppositely disposed threaded aperture, a collar externally threaded to enter said aperture, cooperating abutment means on said camera and on said collar for fixing the position of said collar with respect to said camera, said collar being hollow within, having an opening at one end of a given size, communicating with a larger barrel shaped portion, and a still larger internally threaded portion, a spring washer in said barrel shaped portion, a lens also in said barrel shaped portion, and a hollow threaded sleeve in the interior of said collar, bearing against said lens and determining the position of said lens with respect to the abutment means on said collar, the said spring washer permitting preadjustment of said lens with respect to said collar in conformation with the specific focal length of said lens, said sleeve having a tapered bore acting as a lens shade.

13. In a camera, a body having a film track and an oppositely disposed threaded aperture, a collar externally threaded to enter said aperture, cooperating abutment means on said camera and on said collar for fixing the position of said collar with respect to said camera, said collar being hollow within, having an opening at one end of a given size, communicating with a larger barrel shaped portion, and a still larger internally threaded portion, a spring washer in said barrel shaped portion, a lens also in said barrel shaped portion, and a hollow threaded sleeve in the interior of said collar, bearing against said lens and determining the position of said lens with respect to the abutment means on said collar, the said spring washer permitting preadjustment of said lens with respect to said collar in conformation with the specific focal length of said lens, said sleeve having a tapered bore acting as a lens hood, and having an unthreaded portion of a diameter to enter said barrel shaped portion of said collar.

14. In a camera, a body having a film track and an oppositely disposed threaded aperture, a collar externally threaded to enter said aperture, cooperating abutment means on said camera and on said collar for fixing the position of said collar with respect to said camera, said collar being hollow within, having an opening at one end of a given size, communicating with a larger barrel shaped portion, and a still larger internally threaded portion, a spring washer in said barrel shaped portion, a lens also in said barrel shaped portion, and a hollow threaded sleeve in the interior of said collar, bearing against said lens and determining the position of said lens with respect to the abutment means on said collar, the said spring washer permitting preadjustment of said lens with respect to said collar in conformation with the specific focal length of said lens, said sleeve having a tapered bore acting as a lens hood, and having an unthreaded portion of a diameter to enter said barrel shaped portion of said collar, and cooperating indicia on said camera and on said collar whereby said lens may be focused for distances less than infinity by turning said collar in the threaded opening in said camera body.

GORDON B. POLLOCK.